US012607602B2

(12) United States Patent
Wang

(10) Patent No.: US 12,607,602 B2
(45) Date of Patent: Apr. 21, 2026

(54) EDDY CURRENT INDUCTION SENSING METHOD AND DEVICE

(71) Applicant: NATIONAL TSING HUA UNIVERSITY, Hsinchu City (TW)

(72) Inventor: Ting-Wei Wang, Hsinchu City (TW)

(73) Assignee: NATIONAL TSING HUA UNIVERSITY, Hsinchu City (TW)

( * ) Notice: Subject to any disclaimer, the term of this patent is extended or adjusted under 35 U.S.C. 154(b) by 121 days.

(21) Appl. No.: 18/607,685

(22) Filed: Mar. 18, 2024

(65) Prior Publication Data

US 2024/0418677 A1     Dec. 19, 2024

(30) Foreign Application Priority Data

Jun. 14, 2023   (TW) ................................. 112122253

(51) Int. Cl.
*G01N 27/90*          (2021.01)
*G01N 27/02*          (2006.01)
(52) U.S. Cl.
CPC ..... *G01N 27/9006* (2013.01); *G01N 27/9046* (2013.01); *G01N 27/025* (2013.01); *G01N 27/028* (2013.01)
(58) Field of Classification Search
CPC ........... G01N 27/9006; G01N 27/9046; G01N 27/025; G01N 27/028; G01N 27/90; G01R 15/20; G01R 33/0283; G01R 33/38; G11C 19/085
USPC ....................................................... 324/228
See application file for complete search history.

(56) References Cited

U.S. PATENT DOCUMENTS

| | | | |
|---|---|---|---|
| 6,310,476 B1 | 10/2001 | Kawanami et al. | |
| 7,771,351 B1 * | 8/2010 | Talman ................... | A61B 5/076 |
| | | | 600/300 |
| 2004/0075429 A1 | 4/2004 | Hiroshima | |
| 2008/0246472 A1 | 10/2008 | Igney et al. | |
| 2009/0306524 A1 | 12/2009 | Muhlsteff et al. | |
| 2011/0304328 A1 * | 12/2011 | Yamamoto ......... | G01N 27/9006 |
| | | | 324/240 |
| 2013/0038322 A1 * | 2/2013 | Yamamoto ............. | G01N 27/80 |
| | | | 324/239 |
| 2019/0353618 A1 * | 11/2019 | Jinno ................... | G01N 27/904 |

(Continued)

FOREIGN PATENT DOCUMENTS

| | | |
|---|---|---|
| CN | 101277645 A | 10/2008 |
| CN | 103584847 A | 2/2014 |

(Continued)

*Primary Examiner* — Raul J Rios Russo
(74) *Attorney, Agent, or Firm* — Birch, Stewart, Kolasch & Birch, LLP

(57) ABSTRACT

An eddy current induction sensing method includes: providing an excitation signal to a first coil; generating a first electromagnetic signal, by the first coil, caused by the excitation signal; coupling the first electromagnetic signal to a second coil to cause the second coil to generate a second electromagnetic signal; generating an induced eddy current by a target conductor while the target conductor receives the first electromagnetic signal or the second electromagnetic signal, wherein the induced eddy current at least partially offsets the second electromagnetic signal of the second coil; and measuring, from the second coil, a variation of the at least partially offset second electromagnetic signal to determine a state of the target conductor.

12 Claims, 6 Drawing Sheets

10

S1
providing an excitation signal to a first coil

S2
generating a first electromagnetic signal, by the first coil, caused by the excitation signal S3
coupling the first electromagnetic signal to a second coil to cause the second coil generating a second electromagnetic signal S4
generating an induced eddy current by a target conductor while the target conductor received the first electromagnetic signal or the second electromagnetic signal S5
measuring, from the second coil, a variation of the at least partially offset second electromagnetic signal to determine a state of the target conductor

(56) References Cited

U.S. PATENT DOCUMENTS

2020/0082926 A1        3/2020  Tal et al.
2023/0043106 A1*      2/2023  Gao  .................. G01N 27/9046

FOREIGN PATENT DOCUMENTS

| CN | 109470375 | A | 3/2019 |
|----|-----------|---|--------|
| CN | 110672714 | A | 1/2020 |
| EP | 0 884 588 | A1 | 12/1998 |
| JP | 10-111279 | A | 4/1998 |
| JP | 2019-128161 | A | 8/2019 |

* cited by examiner

10

$$F2_0 = \frac{1}{2\pi\sqrt{L_2 C_2}}$$

$$F2' = \frac{1}{2\pi\sqrt{L_2' C_2}}$$

EDDY CURRENT INDUCTION SENSING METHOD AND DEVICE

TECHNICAL FIELD

The present invention relates to an eddy current induction sensing method and an eddy current induction sensing device. In particular, the present invention relates to an eddy current induction sensing method and an eddy current induction sensing device by using an excitation coil and a receiving coil to reduce interferences of thermal noises.

BACKGROUND

The coil(s) used for conventional eddy current induction sensing devices must perform both excitation and reception functions. However, when a coil receives excitation signals and generates electromagnetic signals, the temperature of the coil will rise due to thermal effects generated by the excitation current and the impedance of the coil. When the coil is excited for a long time, the raised temperature will become significant and difficult to be ignored during the eddy current induction sensing. The raised temperature will affect the electrical values of the coil, such as resistance and/or inductance. Therefore, the thermal effect on the coil will cause errors in measurement, impairing the long-term measurement or the accuracy of measurement.

Although the coil may be configured to switch modes between excitation and reception functions, the temperature of the coil will still rise while performing the excitation function in a high-power or long-term measurement. Besides, frequently switching the coil may also generate signal noises, which leads to measurement inaccuracy.

SUMMARY

One of the objects of the present invention is to provide an eddy current induction sensing method and an eddy current induction sensing device that can reduce the thermal effect of the coil(s) used for eddy current induction sensing.

The preset invention provides an eddy current induction sensing method. The eddy current induction sensing method includes: providing an excitation signal to a first coil; generating a first electromagnetic signal, by the first coil, caused by the excitation signal; coupling the first electromagnetic signal to a second coil to cause the second coil to generate a second electromagnetic signal; generating an induced eddy current by a target conductor while the target conductor receives the first electromagnetic signal or the second electromagnetic signal, wherein the induced eddy current at least partially offsets the second electromagnetic signal of the second coil; and measuring, from the second coil, a variation of the at least partially offset second electromagnetic signal to determine a state of the target conductor.

The preset invention provides an eddy current induction sensing device. The eddy current induction sensing device includes a first coil, a second coil, a signal generating unit coupled to the first coil, and a measuring unit coupled to the second coil. The signal generating unit is configured to provide an excitation signal to the first coil to cause the first coil to generate a first electromagnetic signal, wherein the first electromagnetic signal is coupled to the second coil to cause the second coil to generate a second electromagnetic signal, wherein an induced eddy current is generated by a target conductor while the target conductor receives the first electromagnetic signal or the second electromagnetic signal, wherein the induced eddy current at least partially offsets the second electromagnetic signal of the second coil, and wherein the measuring unit measures, from the second coil, a variation of the at least partially offset second electromagnetic signal to determine a state of the target conductor.

As described above, the eddy current induction sensing method and the eddy current induction sensing device provided by the present invention will perform an eddy current induction measurement on a target conductor through two separate coils. The first coil and the second coil serve as an excitation coil and a reception coil, respectively. Accordingly, the second coil configured to receive the induction signal will not be affected by thermal effects caused by exciting the first coil through providing current or power. Therefore, the accuracy of eddy current induction sensing performed by the present invention will be improved.

BRIEF DESCRIPTION OF THE DRAWINGS

The accompanying drawings are presented to help describe various aspects of the present invention. In order to simplify the accompanying drawings and highlight the contents to be presented in the accompanying drawings, conventional structures or elements in the accompanying drawings may be drawn in a simple schematic way or may be omitted. For example, a number of elements may be singular or plural. These accompanying drawings are provided merely to explain these aspects and not to limit them.

DETAILED DESCRIPTION

Any reference to elements using terms such as "first" and "second" herein generally does not limit the number or order of these elements. Conversely, these names are used herein as a convenient way to distinguish two or more elements or element instances. Therefore, it should be understood that the terms "first" and "second" in the request item do not necessarily correspond to the same names in the written description. Furthermore, it should be understood that references to the first element and the second element do not indicate that only two elements can be used or that the first element needs to precede the second element. Open terms such as "include", "comprise", "have", "contain", and the like used herein means including but not limit to.

The term "coupled" is used herein to refer to direct or indirect electrical coupling between two structures. For example, in an example of indirect electrical coupling, one structure may be coupled with another structure through a passive element such as a resistor, a capacitor, or an inductor.

In the present invention, the term such as "exemplary" or "for example" is used to represent "giving an example, instance, or description". Any implementation or aspect described herein as "exemplary" or "for example" is not necessarily to be construed as preferred or advantageous over other aspects of the present invention. The terms "about" and "approximately" as used herein with respect to a specified value or characteristic are intended to represent within a value (for example, 10%) of the specified value or characteristic.

In the present invention, the "measurement object" of the eddy current induction sensing method/device can be a conductive object, for example, semiconductors, metals, ionic liquids, or blood. However, the "measurement object" also can be a non-conductive object included in a conductor. For example, cracks, embrittlement, or damage on conductors or semiconductors, which will affect the generation of an eddy current. Accordingly, the eddy current induction sensing method/device of the present invention is not limited to the type of "measurement object" mentioned above, and can be applied to any possible applications of the conventional eddy current induction sensing.

First Embodiment

Figure 1:
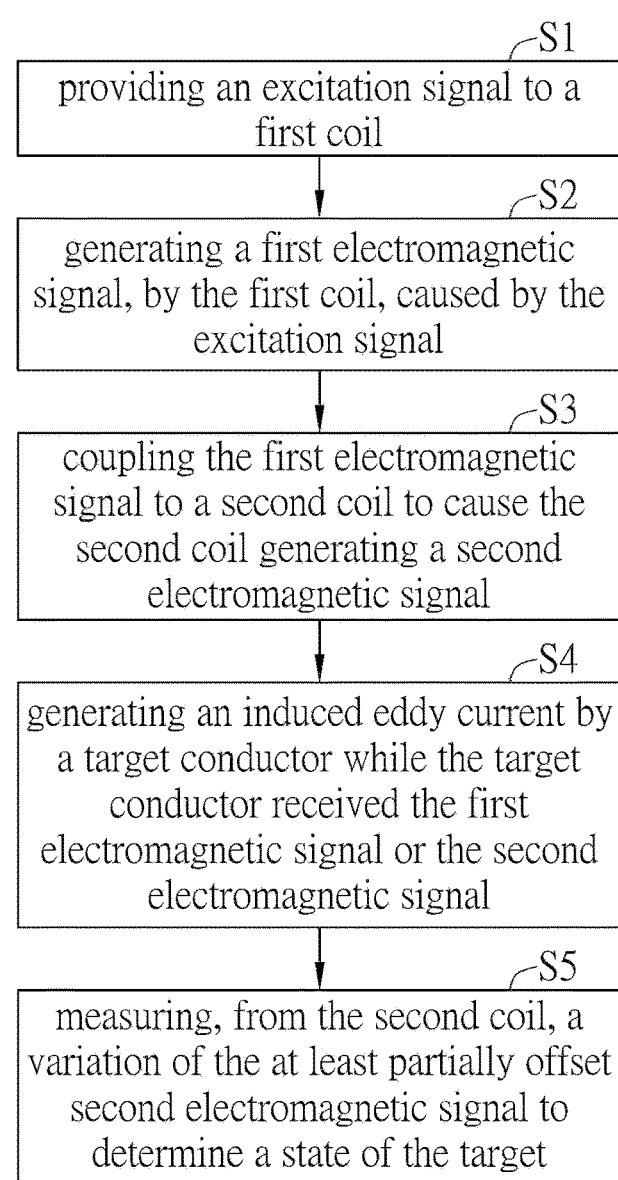
FIG. 1 is a flowchart of the eddy current induction sensing method according to the first embodiment of the present invention.

Referring FIG. 1, FIG. 1 illustrates the flowchart of the eddy current induction sensing method 10. The eddy current induction sensing method 10 includes: (step S1) providing an excitation signal to a first coil; (step S2) generating a first electromagnetic signal, by the first coil, caused by the excitation signal; (step S3) coupling the first electromagnetic signal to a second coil to cause the second coil to generate a second electromagnetic signal; (step S4) generating an induced eddy current by a target conductor while the target conductor receives the first electromagnetic signal or the second electromagnetic signal, wherein the induced eddy current at least partially offsets the second electromagnetic signal of the second coil; and (step S5) measuring, from the second coil, a variation of the at least partially offset second electromagnetic signal to determine a state of the target conductor.

Figure 2:
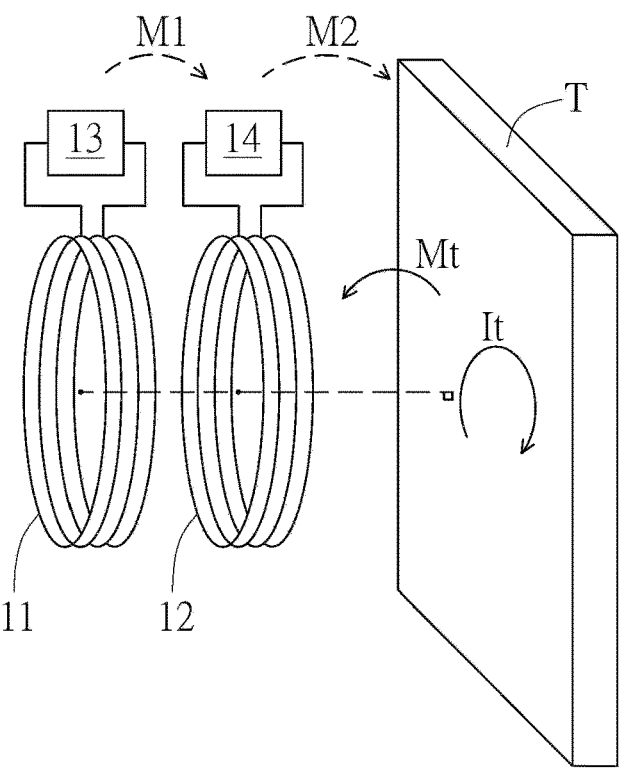
FIG. 2 is a measurement diagram of the eddy current induction sensing method according to the first embodiment of the present invention.
Figure 3:
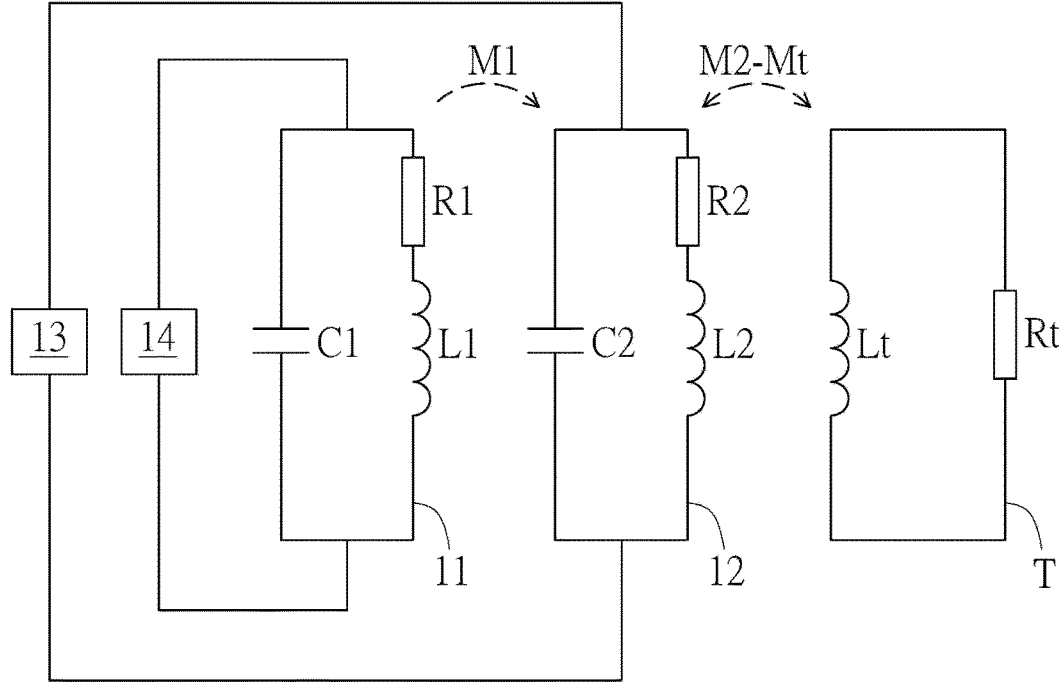
FIG. 3 is the equivalent circuit diagram of the eddy current induction sensing framework shown in FIG. 2.

More specifically, referring FIGS. 2 and 3, FIG. 2 is a schematic diagram of the arrangement of the first coil 11, the second coil 12, and the measurement object (T). FIG. 3 is an equivalent circuit diagram of the framework in FIG. 2. In the step S1, the signal providing means 13 such as a signal generator, resonant circuit, etc. is configured to provide an excitation signal to the first coil 11. The excitation signal may be a sine wave, square wave, triangular wave, or other signal with frequency characteristic. In the step S2, the first coil 11 generates the first electromagnetic signal (M1) receiving response to the excitation signal. For example, the first coil 11 can be considered as a composed circuit (RLC circuit) including the resistor R1, the capacitor C1, and the inductor L1, but not limit thereto. The first coil 11 converts the excitation signal into the first electromagnetic signal (M1) due to electromagnetic effects and radiates the first electromagnetic signal (M1) outward.

In the step S3, the second coil 12 is preferably arranged at the radiation direction of the first coil 11 to get optimal coupling or induction effect. For example, the center of the cross-section of the first coil 11 and the center of the cross-section of the second coil 12 are preferably located in a normal direction of the surface of the measurement object (T), and the center of the cross-section of the first coil 11 and the center of the cross-section of the second coil 12 are preferably in the same straight line. In addition, the second coil 12 is preferably disposed between the first coil 11 and the measurement object (T) to facilitate the reception of an induction signal from the measured object (T). It should be noted that although the size and number of turns of the first coil 11 are the same as the second coil 12 shown in FIG. 2, the present invention is not limited to the above example. For example, the first coil 11 may have different or the same parameters as the second coil 12. The parameters of the first coil 11 or the second coil 12 can be adjusted according to measurement requirements. After coupling with the first coil 11, the second coil 12 will be induced to generate the second electromagnetic signal (M2) corresponding to the first electromagnetic signal (M1). It should be noted that the second electromagnetic signal (M2) may have signal parameters (e.g. frequency) that are the same as, like, or different from the first electromagnetic signal (M1). The signal parameters of the second electromagnetic signal (M2) can be adjusted by tuning the resistance value (R2), capacitance value C2, or inductance value L2 of the second coil 12.

In the step S4, if there is a conductive component in the measurement object T, an induced electric field corresponding to the first electromagnetic signal (M1) and/or the second electromagnetic signal (M2) will be generated. According to Ohm's law, the induced electric field will generate an eddy current (It) on the measurement object (T). The eddy current (It) generated on the measurement object (T) will generate an induced magnetic field (Mt) in the same or different directions as the second electromagnetic signal (M2). The induced magnetic field (Mt) will affect the second electromagnetic signal (M2). In view of the measurement result or the equivalent circuit, the induced magnetic field (Mt) will affect the second coil 12 and cause changes to the inductance value (L2) or impedance value (R2) of the second coil 12. For example, the second electromagnetic signal (M2) is offset by the induced magnetic field (Mt), resulting in a decrease in the measured inductance value (L2) of the second coil 12.

In the step S5, the second coil 12 can be measured by measurement means such as an oscilloscope, a voltmeter, a LCR meter, an impedance analyzer, etc. The state of the measurement object (T) may be determined by the magnitude of the second electromagnetic signal (M2) affected by the induced magnetic field (Mt). For example, the state of the measurement object (T) can be whether there are conductive materials in the measurement object (T), whether there are cracks on a conductive material, or whether the measurement object is an ionic liquid (such as blood or tissue fluid) with periodic/non-periodic volume (such as blood pulse in a blood vessel) or concentration changes (such as concentration variation of the tissue fluid). The state of the measurement object (T) can be determined or judged by measuring the magnitude of the second electromagnetic signal (M2) affected by the induced magnetic field (Mt) through the measurement means 14 (e.g. computer, or microprocessor).

Figure 4:
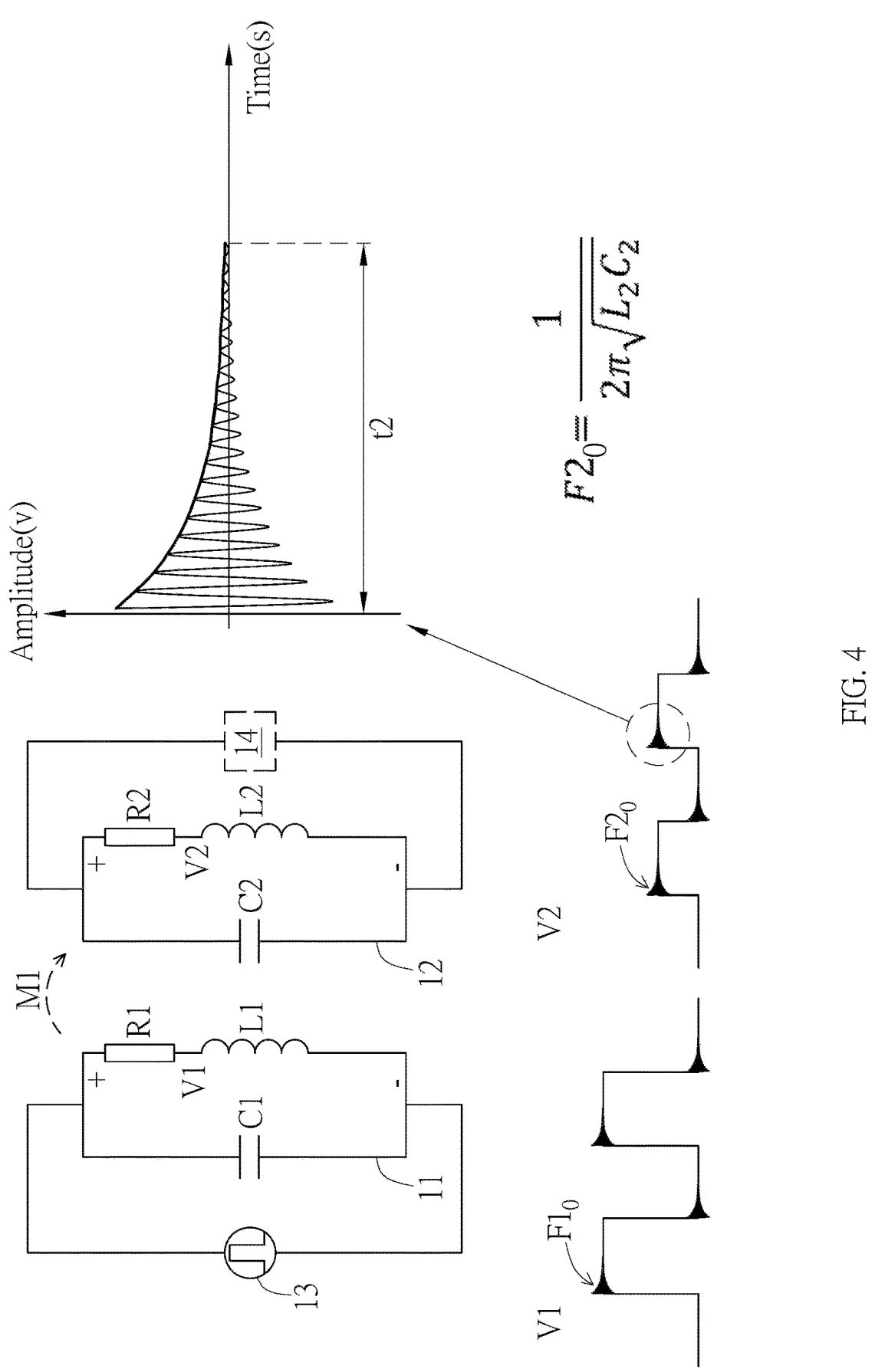
FIG. 4 is a schematic diagram of the eddy current induction sensing method using a square wave signal as the excitation signal according to the first embodiment of the present invention.

In the embodiment, the excitation signal can be a square wave. As shown in FIG. 4, when the excitation signal is a square wave signal and provided to the first coil 11, the transition point of the square wave signal (i.e., the moment of voltage high to voltage low, vice versa) will cause the LC circuit of the first coil 11 to respond instantaneously. The transient response of the first coil 11 will generate the first resonance signal (i.e., the first electromagnetic signal (M1)). The first resonance signal will have an initial frequency (i.e., the first frequency ($F1_0$)) and an oscillation time ($t_1$). Due to the coupling between the second coil 12 and the first coil 11, the first resonance signal generated by the first coil 11 will cause the LC circuit of the second coil 12 to respond instantaneously and generate a second resonance signal (i.e., the second electromagnetic signal (M2)). The second resonance signal has an initial frequency (i.e., the second frequency ($F2_0$)) and an oscillation time ($t_2$). It should be noted that when the LC circuit parameters of the first coil 11 and the second coil 12 are similar, the first frequency ($F1_0$) is equal to or approximates to the second frequency ($F2_0$), and the oscillation time ($t_1$) will be equal to or approximates to the oscillation time ($t_2$). The calculations and determination of the eddy current induction measurement may be simplified by arranging the LC circuit parameters of the first coil 11 and the second coil 12 to be similar, which will reduce computational burden and obtain measurement results more intuitively. It should be noted that the amplitude of the second resonance signal will be smaller than the amplitude of the first resonance signal; therefore, the thermal effect of the second coil 12 will be smaller than that of the first coil 11.

Figure 5A:
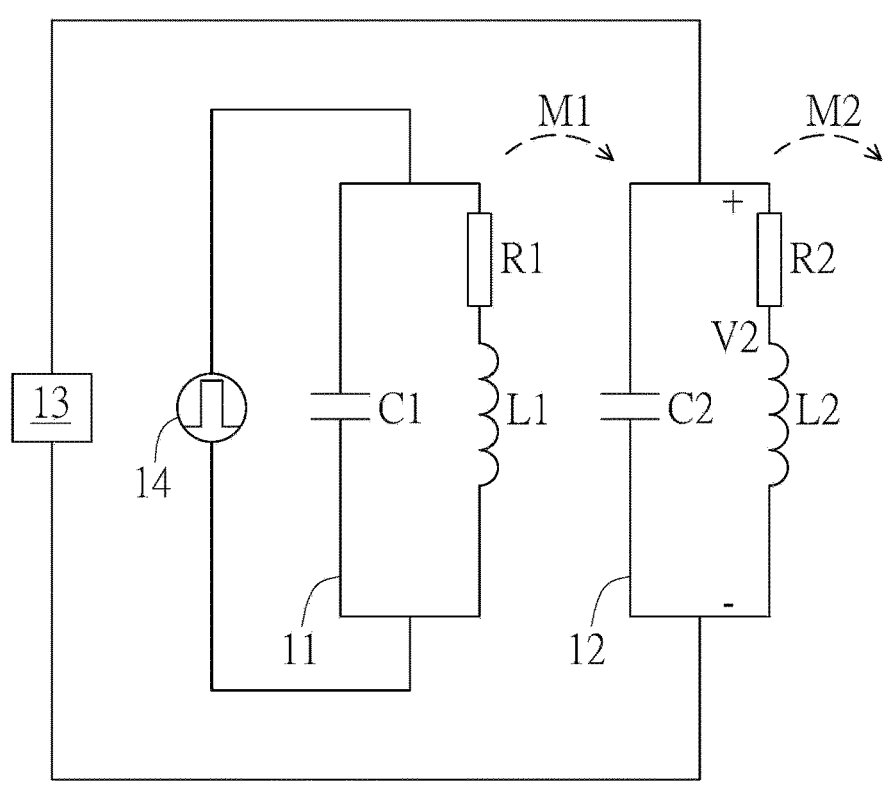
FIG. 5A illustrates an equivalent circuit diagram and a signal schematic diagram when no target conductor is not sensed during the eddy current induction sensing according to the first embodiment of the present invention.
Figure 5A:
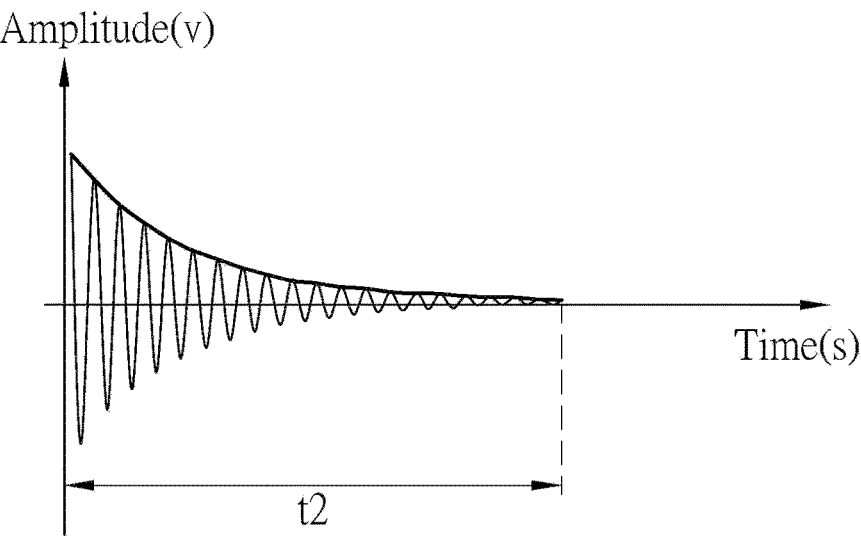
Figure 5B:
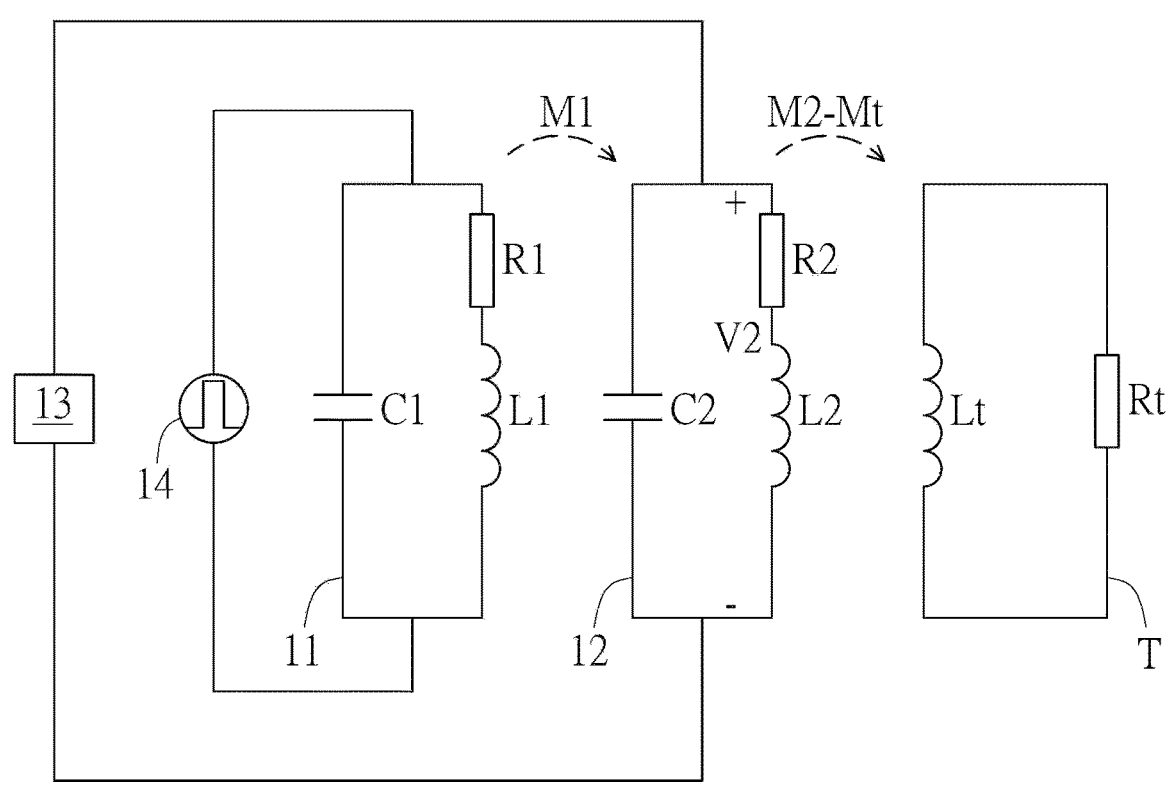
FIG. 5B illustrates an equivalent circuit diagram and a signal schematic diagram when a target conductor is sensed during the eddy current induction sensing according to the first embodiment of the present invention.
Figure 5B:
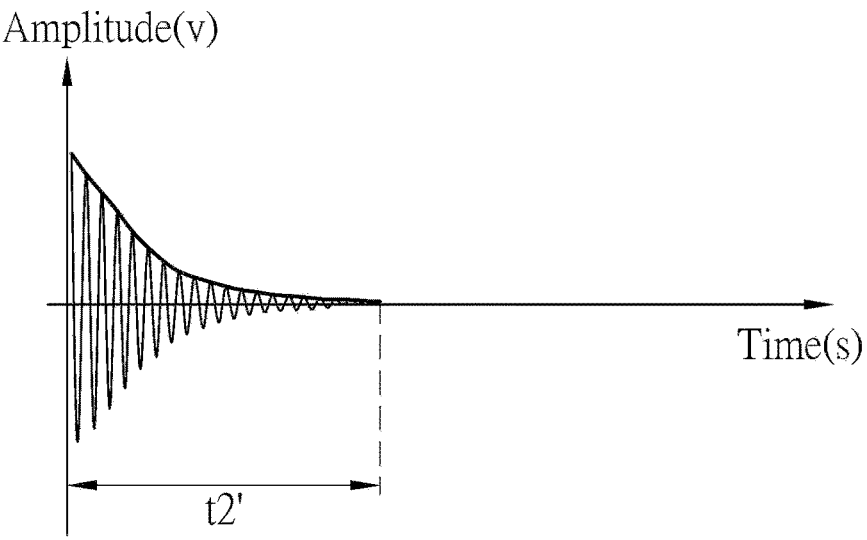

As shown in FIGS. 5A and 5B, when the measurement object (T) (target conductor) appears and approaches the second coil 12 or the first coil 11 (i.e., the effective radiation zone of the first electromagnetic signal (M1) and/or the second electromagnetic signal M2), because the second coil 12 and the measurement object (T) will be treated as a resonance circuit, The second electromagnetic signal (M2) is affected by the measurement object (T), causing the decrease of the measured inductance value (L2') of the second coil 12. Thereby, the resonance frequency of the second resonance signal (F2') will increase. Accordingly, the increased resonance frequency (F2') will be greater than the second frequency ($F2_0$). The induction of the measurement object (T) will also reduce the oscillation time ($t_2$) of the second resonance signal. By measuring variations in signal characteristics (such as the frequency or the oscillation time) of the second resonance signal, the state of the measurement object (T) can be determined. Because the thermal effect of the second coil 12 is relatively small compared to the first coil 11, the state of the measurement object (T) can be determined/judged through parameters such as frequency or time which is less affected or even not affected by the thermal effect caused by excitation the coil. In another aspect, the measurement of the variation in frequency or time makes the second resonance signal less prone to distortion, and the signal-to-noise ratio can be optimized by pre-processing and post-processing such as filtering, so that the variation in frequency or time can be an optimal parameter used to analyze the state of the measurement object (T).

It should be noted that the square wave signal mentioned above is only an example and is not intended to limit the types of the excitation signal of the present invention. In the present invention, the excitation signal only needs to be a signal with frequency characteristics that can cause resonances in the first coil 11 and emit an electromagnetic signal coupled to the second coil 12. The frequency or type of excitation signal can be adjusted according to measurement requirements, such as measurement depth, medium between measurement objects, the thickness of the measurement object, or other factors.

An Eddy current induction measurement is performed on the conductor through the first coil 11 and the second coil 12. The first coil 11 is configured to excite. The second coil 12 is configured to receive induction signals and be measured. Due to the dual coil induction mechanism, the first coil 11 configured to excite the magnetic field is completely separated from the second coil 12 configured to sense the magnetic field. Compared to conventional technologies, the thermal effect of the first coil 11 caused by long-term current input will not affect the inductance and capacitance changes in the second coil 12 during the eddy current induction sensing, thereby reducing the measurement error in the eddy current induction measurement and improving the signal-to-noise ratio during measurement.

Second Embodiment

Figure 6:
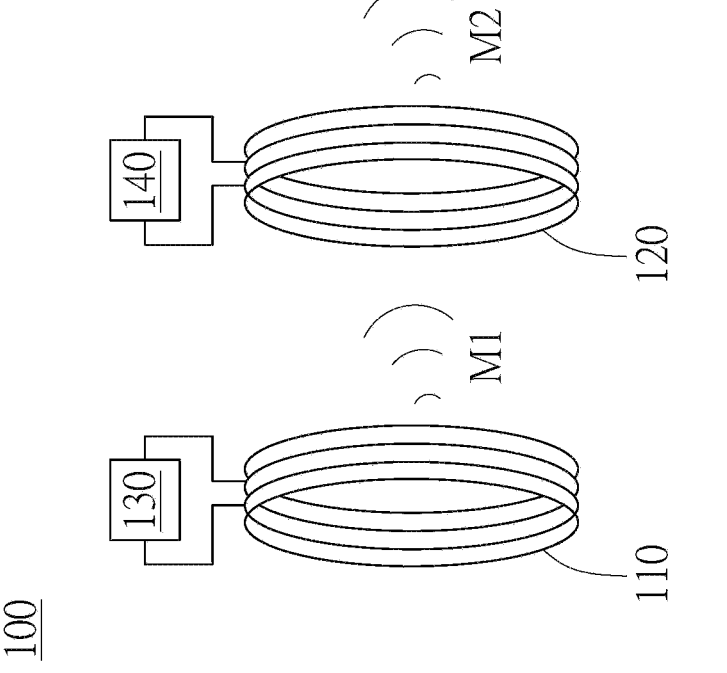
FIG. 6 is a schematic diagram of the eddy current induction sensing device according to the second embodiment of the present invention.

FIG. 6 illustrates the eddy current induction sensing device 100 for performing the eddy current induction sensing method 10. As shown in FIG. 6, the eddy current induction sensing device 100 includes the first coil 110, the second coil 120, the signal generating unit 130 coupled to the first coil 110, and the measuring unit 140 coupled to the second coil 120. The signal generating unit 130 is configured to provide the excitation signal to the first coil 110 to cause the first coil 110 to generate the first electromagnetic signal (M1). The first electromagnetic signal (M1) is coupled to the second coil 120 to cause the second coil 120 to generate the second electromagnetic signal M2. When a target conductor receives the first electromagnetic signal (M1) or the second electromagnetic signal M2, an induced eddy current will be generated. The induced eddy current will at least partially offset the second electromagnetic signal M2 of the second coil 120. The measuring unit 140 measures, from the second coil 120, a variation of the at least partially offset second electromagnetic signal M2 to determine a state of the target conductor.

The first coil 110 and/or the second coil 120 may be a conductive wiring formed on a substrate. More specifically, the conductive wiring can be formed on a substrate by conventional manufacturing techniques such as etching, engraving, and lithography. The pattern of the conductive wiring has at least a radiation portion to output/transmit electromagnetic signals, and receive feedback electromagnetic signals. The first coil 110 and/or the second coil 120 may be a single turn coil, a multi-turn coil, or a spiral coil, but not limited thereto. In addition, the coil formed on the substrate can be a planar coil, for example, a coil pattern formed with the conductive wiring on a single layer of the substrate. In another aspect, the coil formed on the substrate can be stereoscopic, for example, a coil pattern formed with the conductive wiring on at least two layers of the substrate. Fabricating the first coil 110 and/or the second coil 120 by conventional circuit manufacturing methods may effectively enhance the fabrication yield and consistency of the first coil 110 and/or the second coil 120. The first coil 110 and/or the second coil 120 can be easily integrated with other circuit components and modules. However, the first coil 110 and/or the second coil 120 may be standalone components without the need to be arranged on the substrate. For example, the first coil 110 and/or the second coil 120 are coils wound with enameled wire (by example only, not to limit the material of the coil). The first coil 110 and/or the second coil 120 can be made of different materials, different numbers of turns, different shapes or other types of coils with different radiating parts according to the purpose.

The signal generating unit 130 can be an AC/DC signal generator composed by active components (such as oscillators, timers) and/or passive components (such as resistors, capacitors, and/or inductors). For example, the signal generating unit 130 may be configured to directly generate the excitation signal provided to the first coil 110. In another aspect, the signal generating unit 130 may be configured to convert DC signals into the excitation signal. More specifically, the signal generating unit 130 may include a DC supply source and a resonant circuit. The resonant circuit receives the DC signal provided by the DC supply source to generate the excitation signal. By using a DC signal source and a resonant circuit to generate the excitation signal, since the resonant circuit only requires a series/parallel combination of passive components (such as the resistor R, the capacitor C, the inductor L), it can achieve the effect of generating the excitation signal by a simple circuit with low energy consumption. In this embodiment, the signal generating unit 130 preferably provide a square wave signal as the excitation signal.

The measurement unit 140 can be an independent module coupled to the first coil 110. For example, the independent measurement unit 140 can be a programmable or instrument-controllable module or device, such as oscilloscope, impedance analyzer, LCR meter, computer, tablet, industrial computer, instrument, FPGA, microprocessor, etc. The measurement unit 140 arranged as an independent control module will suit for different computing capabilities according to different requirements. For instance, when a high computing capability or a high level of regulatory/safety requirement needs to be met, a control module with advanced computing capability can be selected as the measurement unit 140. On the contrary, when lightweight and easy to carry are needed, a highly integrated component such as system on a chip (SOC) or application specific integrated circuit (ASIC) can be selected as the measurement unit 140.

In the embodiment, the measurement unit 140 is preferably configured to measure the frequency change of the second electromagnetic signal (M2) of the second coil 120 caused by the induction from the measurement object. By measuring the frequency change of the second electromagnetic signal (M2), the state of the measurement object can be determined. Because the thermal effect of the second coil 120 is relatively small, the inductance value and other parameters of the second coil 120 are less affected by the increased temperature of the first coil 110. Therefore, when determining/judging the state of the measurement object through parameters such as frequency or time, more accurate information can be obtained, the signal is less prone to distortion, and measurement results can be optimized through preprocessing and post-processing methods such as filtering.

It should be noted that the eddy current induction sensing method 10 of the present invention is not limited to the eddy current induction sensing device 100. Any modification to the eddy current induction sensing device 100 of the present invention to perform the eddy current induction sensing method 10 should belong to the scope of the present invention.

The previous description of the present invention is provided to enable a person of ordinary skill in the art to make or implement the present invention. Various modifications to the present invention will be apparent to a person skilled in the art, and the general principles defined herein can be applied to other variations without departing from the spirit or scope of the present invention. Therefore, the present invention is not intended to be limited to the examples described herein, but is to be in accord with the widest scope consistent with the principles and novel features of the invention herein.

What is claimed is:

1. An eddy current induction sensing method, comprising:
providing an excitation signal to a first coil;
generating a first electromagnetic signal, by the first coil, caused by the excitation signal;
coupling the first electromagnetic signal to a second coil to cause the second coil to generate a second electromagnetic signal;
generating an induced eddy current by a target conductor while the target conductor receives the first electromagnetic signal or the second electromagnetic signal, wherein the induced eddy current at least partially offsets the second electromagnetic signal of the second coil; and
measuring, from the second coil, a variation of the at least partially offset second electromagnetic signal to determine a state of the target conductor.

2. The eddy current induction sensing method of claim 1, wherein the excitation signal is a square wave signal.

3. The eddy current induction sensing method of claim 1, wherein the first electromagnetic signal has a first frequency, the second electromagnetic signal has a second frequency, and the second frequency is equal to or approximates to the first frequency.

4. The eddy current induction sensing method of claim 1, wherein the second electromagnetic signal has a second frequency, and the at least partially offset second electromagnetic signal has a third frequency larger than the second frequency.

5. The eddy current induction sensing method of claim 4, wherein the variation is the difference between the second frequency and the third frequency.

6. The eddy current induction sensing method of claim 1, wherein the second coil has an initial inductance value; after the second electromagnetic signal of the second coil is at least partially offset, the initial inductance value decreases.

7. An eddy current induction sensing device, comprising:
a first coil;
a second coil;
a signal generating unit coupled to the first coil, wherein the signal generating unit includes an AC/DC signal generator composed of one or more active components and/or passive components and is configured to provide an excitation signal to the first coil to cause the first coil to generate a first electromagnetic signal, wherein the first electromagnetic signal is coupled to the second coil to cause the second coil to generate a second electromagnetic signal; and
a measuring unit coupled to the second coil,
wherein an induced eddy current is generated by a target conductor while the target conductor receives the first electromagnetic signal or the second electromagnetic signal, wherein the induced eddy current at least partially offsets the second electromagnetic signal of the second coil,
wherein the measuring unit measures, from the second coil, a variation of the at least partially offset second electromagnetic signal to determine a state of the target conductor.

8. The eddy current induction sensing device of claim 7, wherein the excitation signal is a square wave signal.

9. The eddy current induction sensing device of claim 7, wherein the first electromagnetic signal has a first frequency, the second electromagnetic signal has a second frequency, and the second frequency is equal to or approximates to the first frequency.

10. The eddy current induction sensing device of claim 7, wherein the second electromagnetic signal has a second frequency, and the at least partially offset second electromagnetic signal has a third frequency larger than the second frequency.

11. The eddy current induction sensing device of claim 10, wherein the variation is the difference between the second frequency and the third frequency.

12. The eddy current induction sensing device of claim 7, wherein the second coil has an initial inductance value; after the second electromagnetic signal of the second coil is at least partially offset, the initial inductance value decreases.

\* \* \* \* \*